United States Patent
Liu et al.

(10) Patent No.: US 12,330,291 B2
(45) Date of Patent: Jun. 17, 2025

(54) JOINT ASSEMBLY, SWING DEVICE, AND ROBOT

(71) Applicant: Fulian Yuzhan Precision Technology Co., Ltd., Shenzhen (CN)

(72) Inventors: Zhen-Xing Liu, Shenzhen (CN); Xiao-Ming Xu, Shenzhen (CN); Bo Long, Shenzhen (CN); Zhen Chen, Shenzhen (CN); Yan-Chun Zhu, Shenzhen (CN)

(73) Assignee: Fulian Yuzhan Precision Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/508,900

(22) Filed: Nov. 14, 2023

(65) Prior Publication Data

US 2024/0165831 A1     May 23, 2024

(30) Foreign Application Priority Data

Nov. 18, 2022     (CN) .......................... 202211445755.3

(51) Int. Cl.
 B25J 17/02     (2006.01)
 B25J 9/14     (2006.01)
(52) U.S. Cl.
 CPC ............. B25J 17/0266 (2013.01); B25J 9/14 (2013.01)

(58) Field of Classification Search
 CPC ...... B25J 17/0266; B25J 17/0275; B25J 9/14; B25J 9/142; B25J 9/0051; F16C 11/0647; F16C 11/0604; F16C 11/068
 See application file for complete search history.

(56) References Cited

U.S. PATENT DOCUMENTS

| 11,692,535 B2 * | 7/2023 | Nishido | F04B 41/02 |
| | | | 417/410.1 |
| 2010/0263471 A1 * | 10/2010 | Weber | B25J 9/0051 |
| | | | 74/490.06 |

FOREIGN PATENT DOCUMENTS

| CN | 114893499 A | * | 8/2022 | ............. F16C 11/08 |
| CN | 115229840 A | | 10/2022 | |
| DE | 102008025845 A1 | | 12/2009 | |
| JP | 2020098017 A | | 6/2020 | |

* cited by examiner

*Primary Examiner* — Gregory Robert Weber
(74) *Attorney, Agent, or Firm* — ScienBiziP, P.C.

(57) ABSTRACT

A joint assembly, a swing device and a robot are provided. The joint assembly includes a movable part defining a movable groove and a rotating part. The rotating part includes a rotating body being a spherical shape. The rotating body is rotatably received in the movable groove to adapt to the movable part. The rotating part defines an air hole with an air inlet and an air outlet. The air inlet is configured to receive introduced air, and the air outlet is configured to expel the air to the movable groove.

19 Claims, 8 Drawing Sheets

JOINT ASSEMBLY, SWING DEVICE, AND ROBOT

CROSS-REFERENCE TO RELATED APPLICATIONS

This application claims priority to Chinese Patent Application No. 202211445755.3 filed on Nov. 18, 2022, in China National Intellectual Property Administration, the contents of which are incorporated by reference herein.

FIELD

The subject matter herein generally relates to swing technology filed, and particularly to a joint assembly, a swing device, and a robot.

BACKGROUND

In an automated production process, ball joint structures are used in many portions, such as a transfer mechanism of a robotic arm. The ball joint structure generally includes relatively rotatable parts for realizing changes in angle and position.

However, during use of the currently used ball joint structure, the relatively rotatable parts are in direct contact, and the contact area is large, the generated friction force is large, resulting in damage to the relatively rotatable parts, reducing a service life of the ball joint structure. In addition, due to the large friction force, the relative rotation speed of the relatively rotatable parts will be reduced, reducing the operation efficiency of the ball joint structure.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Implementations of the disclosure will now be described, by way of embodiments only, with reference to the drawings. The disclosure is illustrative only, and changes may be made in the detail within the principles of the present disclosure. It will, therefore, be appreciated that the embodiments may be modified within the scope of the claims.

Unless otherwise defined, all technical terms used herein have the same meaning as commonly understood by one of ordinary skill in the art. The technical terms used herein are to provide a thorough understanding of the embodiments described herein but are not to be considered as limiting the scope of the embodiments.

Several definitions that apply throughout this disclosure will now be presented.

The term "coupled" is defined as connected, whether directly or indirectly through intervening components, and is not necessarily limited to physical connections. The term "substantially" is defined to be essentially conforming to the particular dimension, shape or other word that the term modifies, such that the component need not be exact. The term "comprising," when utilized, means "including, but not necessarily limited to", it specifically indicates open-ended inclusion or membership in the so-described combination, group, series, and the like.

Figure 1:
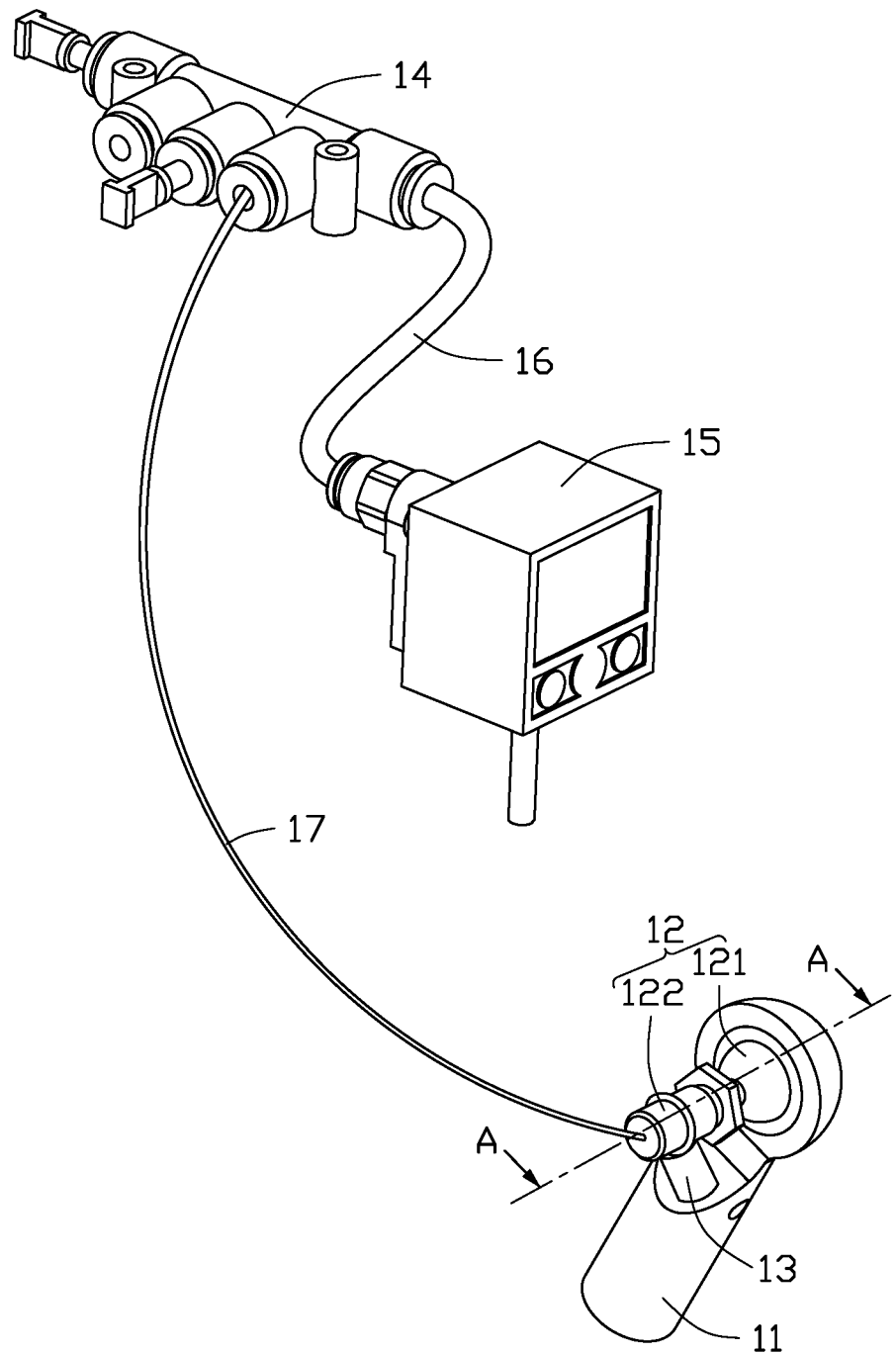
FIG. 1 illustrates a schematic view of an embodiment of a joint assembly.
Figure 2:
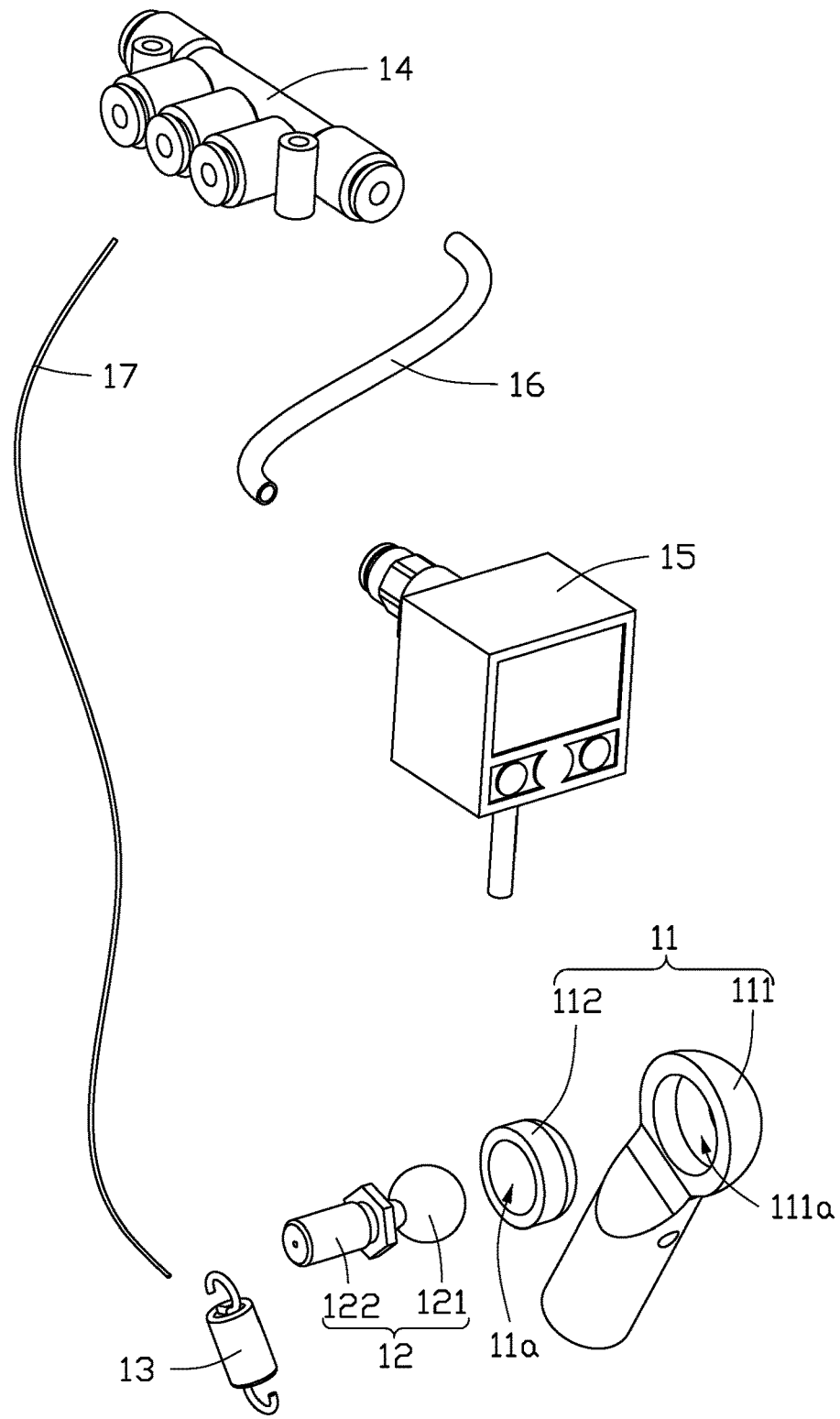
FIG. 2 illustrates an explored view of an embodiment of the joint assembly of FIG. 1.
Figure 3:
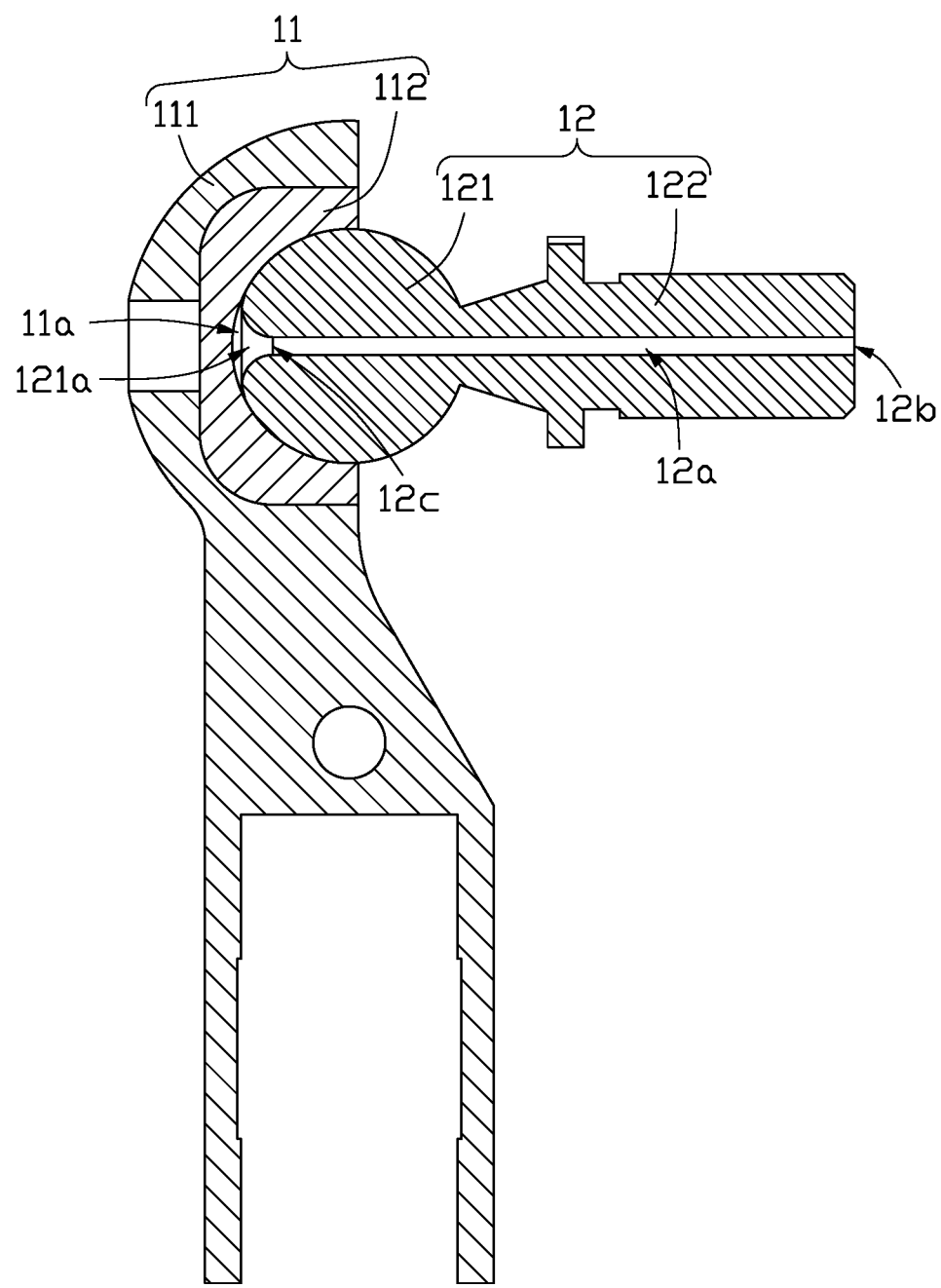
FIG. 3 illustrates a cross-sectional view of an embodiment of the joint assembly of FIG. 1 along an A-A direction.

FIGS. 1 and 2 illustrate schematic views of at least one embodiment of a joint assembly 10, including a movable part 11 and a rotating part 12. Referring to FIG. 2, the movable part 11 defines a movable groove 11a, and the rotating part 12 includes a rotating body 121 in a spherical shape. The rotating body 121 is received in the movable groove 11a to adapt to the movable part 11. Referring to FIG. 3, the rotating part 12 defines an air hole 12a, and the air hole 12a includes an air inlet 12b and an air outlet 12c. The air outlet 12c is communicated with the movable groove 11a. Air can be introduced into the air hole 12a through the air inlet 12b, and the air can be introduced into the movable groove 11a through the air outlet 12c.

In the joint assembly 10, since the air can be introduced into the air hole 12a through the air inlet 12b, and further introduced into the movable groove 11a through the air outlet 12c, the air finally overflows from a gap between a bottom wall of the movable groove 11a and the rotating body 121, rendering an air protecting layer is formed between the bottom wall of the movable groove 11a and the rotating body 121, decreasing a contact area between the rotating body 121 and the movable groove 11a, decreasing a force of friction between the rotating body 121 and the movable groove 11a, so as to decrease an abrasion between the rotating body 121 and the movable part 11 when in operation and improve a service life of the joint assembly 10. In addition, since the force of friction between the rotating body 121 and the movable part 11 is small, a rotating speed of the rotating part 12 relative to the movable part 11 can be improved, and an operation efficiency can be improved accordingly.

Referring to FIG. 2, in at least one embodiment, the movable part 11 includes a movable body 111 and a buffer body 112. The movable body 111 defines a receiving groove 111a, the buffer body 112 is embedded in the receiving groove 111a, the buffer body 112 defines the movable groove 11a. For instance, the buffer body 112 can be made of flexible materials, such as rubber blanket or plastic blanket, etc.

Thus, the buffer body 112 may decrease a hard contact between the bottom wall of the movable groove 11a and the rotating body 121, decrease an abrasion between the rotating body 121 and the movable body 111, and improve a service life of the rotating body 121 and the movable body 111. The buffer body 112 is received in the receiving groove 111a, so the buffer body 112 may be detachably connected to the movable body 111, the buffer body 112 may be easily changed, the entire movable part 11 may not need to be changed caused by abrasion, a use-cost of the movable part 11 may be decreased.

In at least one embodiment, the rotating body 121 defines a rotating groove 121a, the air hole 12a is communicated with the rotating groove 121a through the air outlet 12c.

Thus, the rotating groove 121a of the rotating body 121 and the bottom wall of the movable groove 11a cooperatively form an air chamber, which may buffer the air introduced from the air outlet 12c, decrease an impact of the air introduced from the air outlet 12c to the movable part 11, and prevent the movable part 11 from be apart from the rotating body 121.

Referring to FIG. 2, in at least one embodiment, the rotating part 12 further includes a fixed body 122. One end of the fixed body 122 is connected to the rotating body 121, another end of the fixed body 122 is connected to external members (such as a connecting part 21 described in the following embodiments) to fix the rotating part 12, the air hole 12a passes through the fixed body 122 and the rotating body 121, the air inlet 12b is defined in the fixed body 122.

Thus, the fixed body 122 may fix the rotating part 12, which is beneficial to be manufactured to form the air outlet 12c.

In at least one embodiment, the fixed body 122 may be a column, the rotating body 121 may be a sphere, the fixed body 122 and the rotating body 121 may be integrated molded.

In at least one embodiment, the joint assembly 10 further includes a first elastic part 13. Opposite ends of the first elastic part 13 are connected to the fixed body 122 and the movable part 11. For instance, the first elastic part 13 may be a spring.

Thus, the first elastic part 13 may pull the rotating part 12 and the movable part 11 to close to each other, which may prevent over pressures of the air introduced from the air inlet 12b and the air outlet 12c from separating the rotating part 12 and the movable part 11, improving a stability of the joint assembly 10.

Referring to FIGS. 2 and 3, in at least one embodiment, the joint assembly 10 further includes an air inlet part 14, a detecting part 15, a first pipe 16, and a second pipe 17. The air inlet part 14 is configured to introduce compressed air. The detecting part 15 is configured to detect an air pressure in the movable groove 11a. Opposite ends of the first pipe 16 are connected to the air inlet part 14 and the detecting part 15. Opposite ends of the second pipe 17 are connected to the air inlet part 14 and the air inlet 12b. For instance, the detecting part 15 may be an air pressure detector.

When the joint assembly 10 in operation, introducing air to the air inlet part 14, the air enters the detecting part 15 and the movable groove 11a, until the detecting part 15 shows the air pressure in the air inlet part 14 and the movable groove 11a are stable, then the joint assembly 10 may coordinate with other parts (such as a first swing rod 22, a connecting part 21, and a mounting part 30 described in the following embodiments). If the detecting part 15 shows the air pressure changes without a float range, which means the joint assembly 10 may be abnormal, such as the pressure corresponding to the air inlet part 14 is too low, meaning air introduced to the air inlet part 14 is not enough or air leaking of the air inlet part 14, the joint assembly 10 needed to be repaired based on the corresponding problem.

Thus, the air inlet part 14, the detecting part 15, the first pipe 16, and the second pipe 17 may detect the pressure in the joint assembly 10 in real time, detect the pressure in the movable groove 11a, conveniently adjusting the joint assembly 10 in time based on the pressure, and the operating efficiency of the joint assembly 10 may be improved.

It should be known that, since there is the gap between the rotating body 121 and the movable groove 11a, the pressure of the air introduced into movable groove 11a is lower than the pressure of the air in the air inlet part 14.

Figure 4:
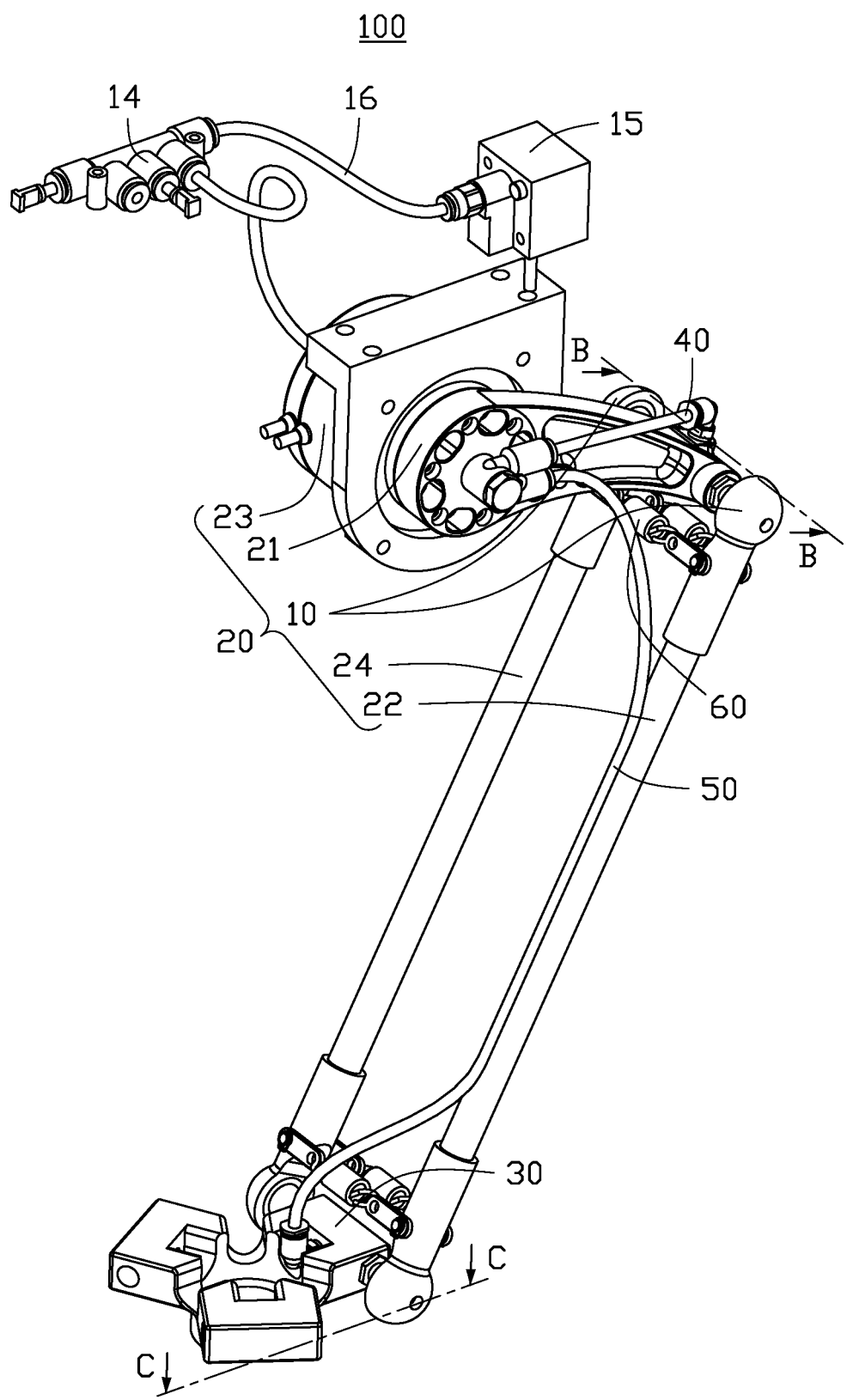
FIG. 4 illustrates a schematic view of an embodiment of a swing device.
Figure 5:
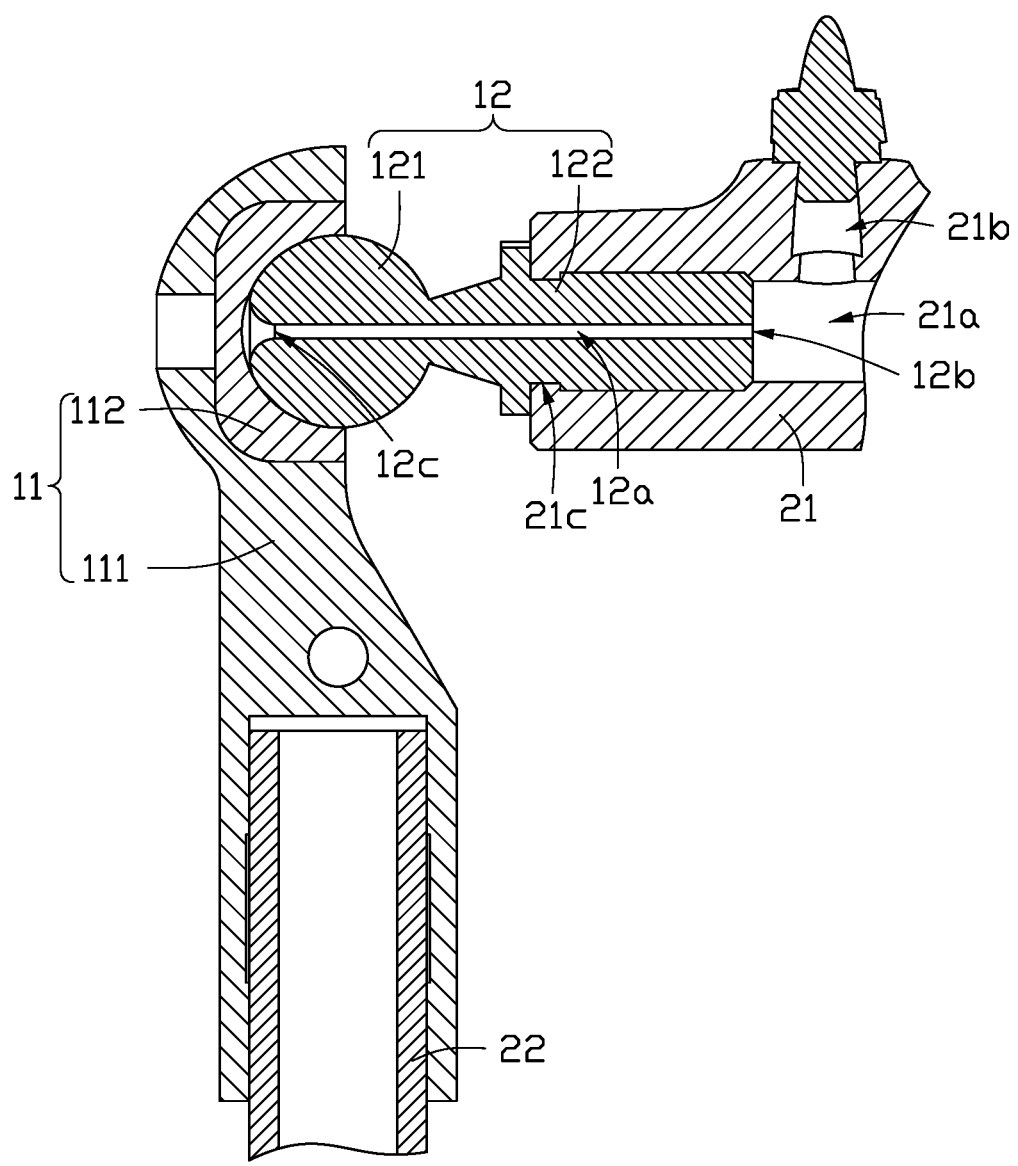
FIG. 5 illustrates across-sectional view of an embodiment of a first swing rod, a rotating part, a movable part, and a mounting part of the swing device of FIG. 4 along a B-B direction.
Figure 6:
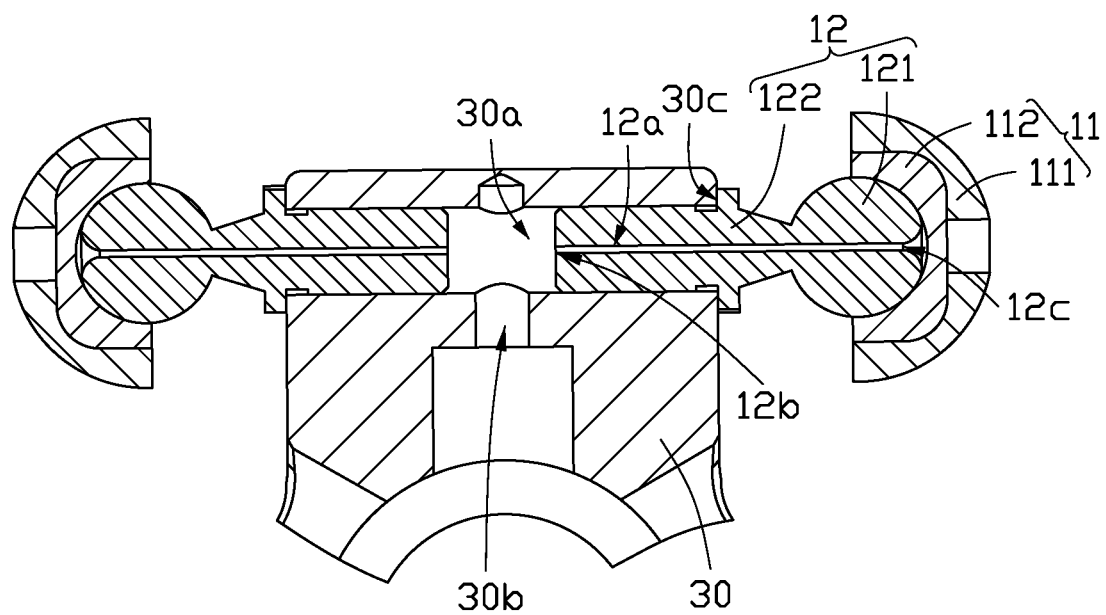
FIG. 6 illustrates a cross-sectional view of an embodiment of the first swing rod, a second swing rod, the rotating part, the movable part, and the mounting part of the swing device of FIG. 4 along a C-C direction.

Referring to FIG. 4, the at least one embodiment of the present disclosure further provides a swing device 100, including a swing mechanism 20 and a mounting part 30. The swing mechanism 20 includes a connecting part 21, a first swing rod 22, a driving part 23, and the joint assembly 10. A group of joint assemblies 10 are arranged on opposite ends of the first swing rod 22, the opposite ends of the first swing rod 22 are further connected to a pair of movable parts 11. Referring to FIGS. 4 and 5, one end of the connecting part 21 is connected to the rotating part 12 positioned on one end of the first swing rod 22, the end of the connecting part 21 defines a first air inlet hole 21a connecting to the air inlet 12b, the other end of the connecting part 21 is connected to the driving part 23 for driving the connecting part 21. FIGS. 4, 5, and 6, the mounting part 30 is connected to the rotating part 12 positioned on the other end of the first swing rod 22, the mounting part 30 defines a second air inlet hole 30a connecting to the air inlet 12b, the mounting part 30 is configured to connect to external transfer part for transferring materials. For instance, the transfer part may be a clamping jaw, a suction cup, etc., the driving part 23 may be a motor or an electrical machinery.

When the swing device 100 in operation, the joint assembly 10 is introduced with air, the driving part 23 drives the connecting part 21, so the first swing rod 22 drives the mounting part 30 to change a position of the mounting part 30. In the joint assembly 10 included in the swing device 100, the force of friction between the rotating body 121 and the movable groove 11a is small, which may improve the rotating speed of the rotating part 12 relative to the movable part 11 and the operation efficiency of the swing device 100.

Referring to FIG. 5, in at least one embodiment, the first air inlet hole 21a includes a first inlet port 21b and a first outlet port 21c communicated with the first air inlet hole 21a. The first inlet port 21b is configured to introduce air, the end of the rotating part 12 (the fixed body 122 mentioned above) defining the air inlet 12b is inserted to the first outlet port 21c and connected to the connecting part 21 by screw joint.

Thus, the rotating part 12 and the connecting part 21 are in detachable connection, which is convenient for assembling and disassembling, the first inlet port 21b, the air inlet 12b, and the air outlet 12c are communicated in that order, forming a path for the air introducing into the movable groove 11a, which is simple in structure and low cost in manufacture.

Referring to FIG. 6, in at least one embodiment, the second air inlet hole 30a includes a second inlet port 30b and a second outlet port 30c communicated with the second air inlet hole 30b. The second inlet port 30b is configured to introduce air, the end of the rotating part 12 (the fixed body 122 mentioned above) defining the air inlet 12b is inserted into the second outlet port 30c and connected to the mounting part 30 by screw joint.

Thus, the rotating part 12 and the mounting part 30 are in detachable connection, which is convenient for assembling and disassembling, the second inlet port 30b, the air inlet 12b, and the air outlet 12c are communicated in that order, forming a path for the air introducing into the movable groove 11a, which is simple in structure and low cost in manufacture.

Figure 7:
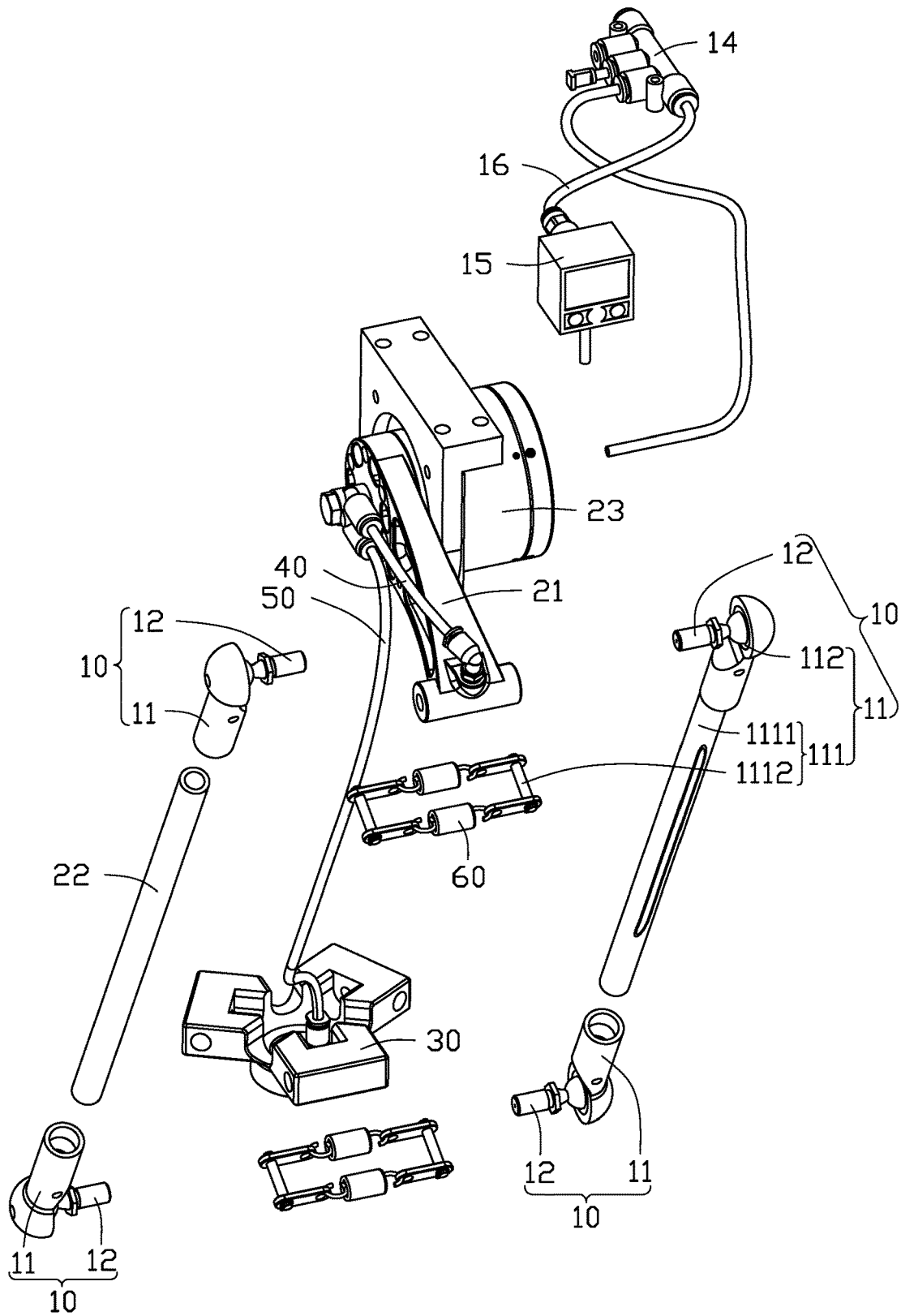
FIG. 7 illustrates an explored view of an embodiment of the swing device of FIG. 4.

Referring to FIG. 7, in at least one embodiment, the swing device 100 further includes the air inlet part 14, the detecting part 15, the first pipe 16, a third pipe 40, and a fourth pipe 50. The air inlet part 14 is configured to introduce air. The detecting part 15 is configured to detect an air pressure in the movable groove 11a. Opposite ends of the first pipe 16 are connected to the air inlet part 14 and the detecting part 15. Opposite ends of the third pipe 40 are connected to the air inlet part 14 and the first inlet port 21b of the first air inlet hole 21a. Opposite ends of the fourth pipe 50 are connected to the air inlet part 14 and the second inlet port 30b of the second air inlet hole 30a. For instance, the detecting part 15 may be an air detector.

When the swing device 100 in operation, the air inlet part 14 is introduced with air, the air is then guided to the detecting part 15 and the movable groove 11a, until the air pressure in the detecting part 15 and the movable groove 11a are stable, then the joint assembly 10 may coordinate with the first swing rod 22, the connecting part 21, the driving part 23, and the mounting part 30 to operate. In detail, during the operation, if the detecting part 15 shows the air pressure changes without the float range, which means the joint assembly 10 may be abnormal, such as the pressure corresponding to the air inlet part 14 is too low, meaning air introduced to the air inlet part 14 is not enough or air leaking of the air inlet part 14, the joint assembly 10 needed to be repaired based on the corresponding problem.

Thus, the air inlet part 14, the detecting part 15, the first pipe 16, the third pipe 40, and the fourth pipe 50 may detect the pressure in the movable groove 11a of the pressure in the swing device 100, conveniently adjusting the joint assembly 10 in time based on the pressure, and the operating efficiency of the swing device 100 may be improved.

Referring to FIGS. 4, 5, 6, and 7, in at least one embodiment, the swing mechanism 20 further includes a second swing rod 24. The second swing rod 24 and the first swing rod 22 are positioned on opposite sides of the connecting part 21. Two joint assemblies 10 are arranged on opposite ends of the second swing rod 24, the opposite ends of the second swing rod 24 are further connected to a pair of movable parts 11. The connecting part 21 is further connected to the rotating part 12 positioned on one end of the second swing rod 24, the first air inlet hole 21a is communicated with the air inlets 12b of the two rotating parts 12. The mounting part 30 is further connected to the rotating part 12 positioned on the other end of the second swing rod 24, and the second air inlet hole 30a is communicated with the air inlets 12b of the two rotating parts 12.

Thus, the first swing rod 22 and the second rod 24 are positioned on two ends of the connecting part 21, and connected to the connecting part 21 through the joint assembly 10, so the swing mechanism 20 forms a rectangular structure, which may improve the stability of driving the mounting part 30.

In at least one embodiment, the end of each movable part 11 far away from the movable groove 11a is engaged with an end of the first swing rod 22, and/or, the end of each movable part 11 far away from the movable groove 11a is engaged with an end of the second swing rod 24.

In detail, in the four joint assemblies 10 of the swing mechanism 20, only two movable parts 11 are engaged to the opposite ends of the first swing rod 22, or only two movable parts 11 are engaged to the opposite ends of the second swing rod 24, or four movable parts 11 are engaged to the corresponding swing rods to form engaged structures. In at least one embodiment, four movable parts 11 are engaged to the corresponding swing rods to form engaged structures.

Thus, the movable part 11 and the swing rod form engaged structures, which is convenient for assembling and disassembling of the movable part 11, improving assembling and disassembling efficiency of the swing mechanism 20.

Referring to FIGS. 4 and 7, in at least one embodiment, the swing device 100 further includes a second elastic part 60. Opposite ends of the second elastic part 60 are connected to at least one of the first swing rod 22 and the second swing rod 24, the pair of movable parts 11 positioned on opposite ends of the connecting part 21, the pair of movable parts 11 positioned on opposite ends of the mounting part 30. For instance, the second elastic part 60 may be a spring.

In detail, a quantity of the second elastic part 60 may be one, opposite ends of the second elastic part 60 are connected to at least one of the first swing rod 22 and the second swing rod 24, the pair of movable parts 11 positioned on opposite ends of the connecting part 21, the pair of movable parts 11 positioned on opposite ends of the mounting part 30. The quantity of the second elastic part 60 may be two or more, the second elastic parts 60 may be connected to the first swing rod 22, the second swing rod 24, and the pair of movable parts 11. Furthermore, the second elastic part 60 may be two springs, opposite ends of the two springs are connected to same parts.

Thus, the second elastic part 60 may pull the first swing rod 22 and the second swing rod 24 to close to each other, preventing the rotating part 12 separating from the movable part 11 caused by over air pressure expelled by the air outlet 12c, so as to improve the stability of the swing device 100.

In at least one embodiment, the pair of movable parts 11 positioned on opposite ends of the connecting part 21 may be connected to two springs, the pair of movable parts 11 positioned on opposite ends of the mounting part 30 may be connected to two springs. Furthermore, in at least one embodiment, the movable body 111 includes an engaging portion 1111 and a pin 1112. One end of the engaging portion 1111 engaging portion 1111 defines the receiving groove 111a, another end of the engaging portion 1111 is engaged with an end of the corresponding swing rod. The pin 1112 is inserted through the engaging portion 1111 and the swing rod engaged with the engaging portion 1111, the pin 1112 is protruded from the engaging portion 1111 and is connected to an end of the spring.

Figure 8:
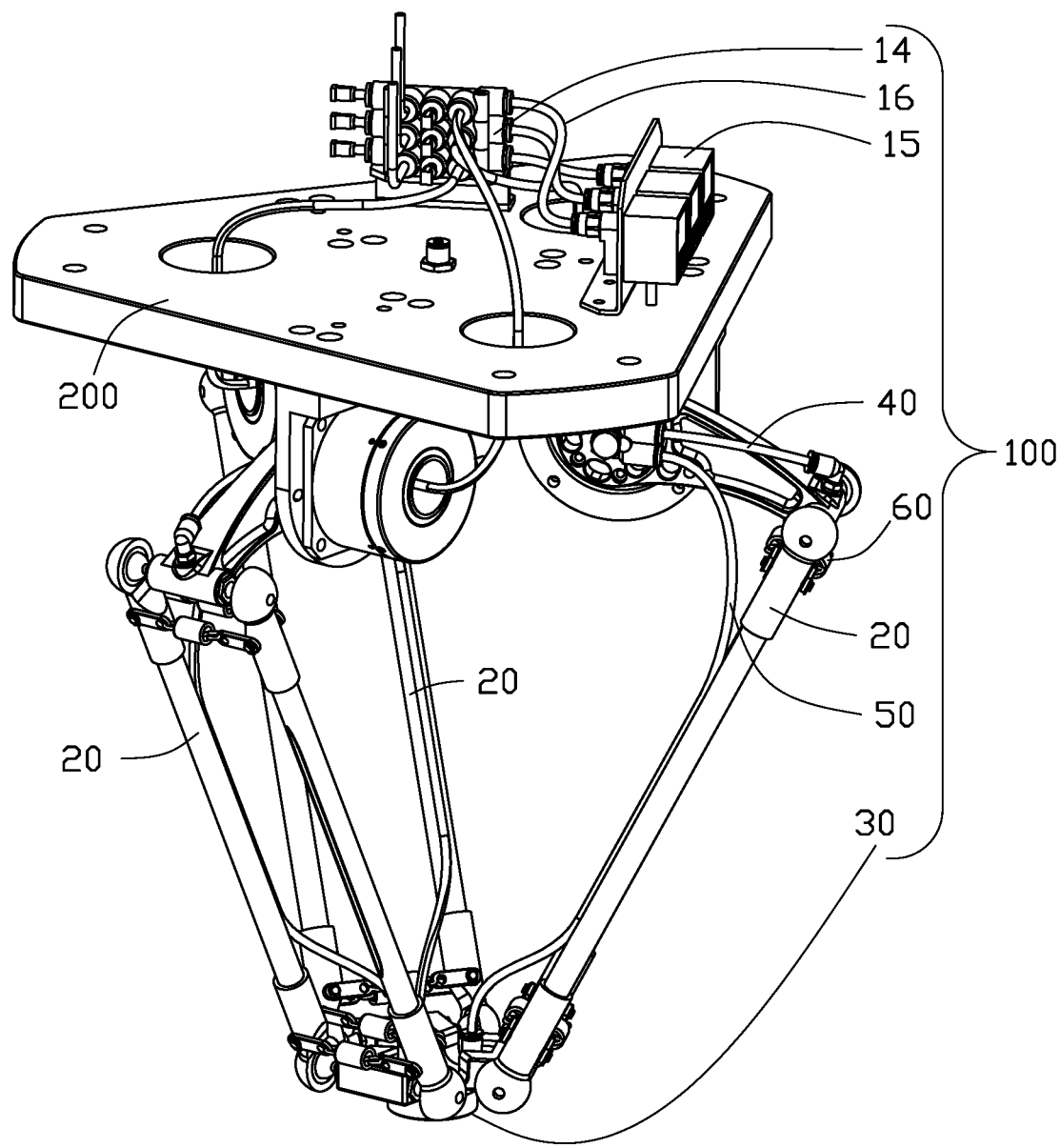
FIG. 8 illustrates a schematic view of an embodiment of a robot.

Referring to FIG. 8, one embodiment of a robot 1000 is a delta robot, including a support base 200 and the swing device 100. The support base 200 is configured to connect external driving mechanism (such as a mechanical arm) for driving the robot 1000. The driving part 23 of the swing device 100 may be connected to the support base 200.

When the robot 1000 in operation, the external driving mechanism drives the support base 200 to move to a target position, the joint assembly 10 is introduced with air, the driving part 23 drives the connecting part 21, so the first swing rod 22 drives the mounting part 30 to change a position of the mounting part 30, so as to precisely transfer materials. In the joint assembly 10 included in the robot 1000, the force of friction between the rotating body 121 and the movable part 11 is small, which may improve the rotating speed of the rotating part 12 relative to the movable part 11 and the operation efficiency of the robot 1000.

In at least one embodiment, a quantity of the swing mechanism 20 can be several, the several swing mechanisms 20 are arranged around the support base 200. The mounting part 30 defines a plurality of second air inlet holes 30a arranged around the mounting part 30, the plurality of second air inlet holes 30a are communicated with the air inlet 12b of the corresponding rotating part 12.

Thus, the several swing mechanisms 20 may cooperatively work, through driving the mounting part 30 to several positions, the position of the mounting part 30 can be adjusted, comparing to driving to a single position by the swing mechanism, a moving efficiency and a precision of the mounting part 30 can be improved.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A joint assembly comprising:
a movable part defining a movable groove; and
a rotating part comprising a rotating body being a spherical shape, the rotating body rotatably received in the movable groove to adapt to the movable part, the rotating part defining an air hole with an air inlet and an air outlet, the air inlet configured to receive introduced air, and the air outlet configured to expel the air to the movable groove;
wherein the rotating body defines a rotating groove, the rotating groove and a bottom wall of the movable groove cooperatively form an air chamber, and the air hole is communicated with the rotating groove through the air outlet.

2. The joint assembly according to claim 1, wherein the movable part comprises:
a movable body defining a receiving groove, and
a buffer body embedded in the receiving groove, the buffer body defining the movable groove.

3. The joint assembly according to claim 1, wherein the rotating part further comprises a fixed body, one end of the fixed body is connected to the rotating body, another end of the fixed body is connected to external members for fixing the rotating part, and the air hole extends through the fixed body and the rotating body, the air inlet is defined in the fixed body.

4. The joint assembly according to claim 3, further comprising a first elastic part, wherein opposite ends of the first elastic part are connected to the fixed body and the movable part.

5. The joint assembly according to claim 1, further comprising:
an air inlet part for introducing the air to the air inlet;
a detecting part for detecting an air pressure in the movable groove;
a first pipe, opposite ends of the first pipe connected to the air inlet part and the detecting part; and
a second pipe, opposite ends of the second pipe connected to the air inlet part and the air inlet.

6. A swing device comprising:
a swing mechanism comprising:
a plurality of joint assemblies, each of the plurality of joint assemblies comprising:
a movable part defining a movable groove; and
a rotating part comprising a rotating body being a spherical shape, the rotating body rotatably received in the movable groove to adapt to the movable part, the rotating part defining an air hole with an air inlet and an air outlet, the air inlet configured to receive introduced air, the air outlet configured to expel the air to the movable groove;
a first swing rod, a group of the joint assemblies arranged on opposite ends of each first swing rod, the opposite ends of the first swing rod connected to a pair of the movable parts,
a connecting part, an end of the connecting part connected to the rotating part positioned on one end of the first swing rod, the end of the connecting part defining a first air inlet hole connecting to the air inlet;
a driving part connected to another end of the connecting part, the driving part configured to drive the connecting part for movement; and
a mounting part connected to the rotating part positioned on one of the opposite ends of the first swing rod, the mounting part defining a second air inlet hole connecting to the air inlet, the mounting part configured to be connected to external transfer part for transferring materials.

7. The swing device according to claim 6, wherein the first air inlet hole comprises a first inlet port and a first outlet port communicated with the first air inlet hole, and the first inlet port is configured to introduce the air, an end of the rotating part defining the air inlet is inserted into the first outlet port and connected to the connecting part.

8. The swing device according to claim 6, wherein the second air inlet hole comprises a second inlet port and a second outlet port communicated with the second air inlet hole, and the second inlet port is configured to introduce air, an end of the rotating part defining the air inlet is inserted into the second outlet port and connected to the mounting part.

9. The swing device according to claim 6, further comprising:
an air inlet part configured to introduce the air;
a detecting part configured to detect an air pressure in the movable groove;
a first pipe, opposite ends of the first pipe connected to the air inlet part and the detecting part;
a third pipe, opposite ends of the third pipe connected to the air inlet part and the first inlet port; and
a fourth pipe, opposite ends of the fourth pipe connected to the air inlet part and the second inlet port.

10. The swing device according to claim 6, wherein the swing mechanism further comprises
a second swing rod, the second swing rod and the first swing rod are positioned on opposite sides of the connecting part, two of the plurality of joint assemblies are arranged on opposite ends of the second swing rod, the opposite ends of the second swing rod are further connected to a pair of the movable parts, and
the connecting part is further connected to the rotating part positioned on one end of the second swing rod, the first air inlet hole is communicated with the air inlets of two rotating parts, the mounting part is further connected to the rotating part positioned on another end of the second swing rod, and the second air inlet hole is communicated with the air inlets of the two rotating parts.

11. The swing device according to claim 10, wherein an end of each of the movable parts far away from the movable groove is engaged with an end of the first swing rod, and/or the end of each of the movable parts far away from the movable groove is engaged with an end of the second swing rod.

12. The swing device according to claim 10, further comprising a second elastic part, opposite ends of the second elastic part connected to at least one of the first swing rod and the second swing rod, the pair of the movable parts positioned on opposite ends of the connecting part, the pair of the movable parts positioned on opposite ends of the mounting part.

13. A robot comprising:
  a support base configured to connect external driving mechanism for driving the robot; and
  a swing device comprising
    at least one swing mechanism comprising:
      a plurality of joint assemblies, each of the plurality of joint assemblies comprising:
        a movable part defining a movable groove; and
        a rotating part comprising a rotating body being a spherical shape, the rotating body rotatably received in the movable groove to adapt to the movable part, the rotating part defining an air hole with an air inlet and an air outlet, the air inlet configured to receive introduced air, the air outlet configured to expel the air to the movable groove;
      a first swing rod, a group of the joint assemblies arranged on opposite ends of each first swing rod, the opposite ends of the first swing rod connected to a pair of the movable parts,
      a connecting part, an end of the connecting part connected to the rotating part positioned on one end of the first swing rod, the end of the connecting part defining a first air inlet hole connecting to the air inlet;
      a driving part connected to the support base and another end of the connecting part, the driving part configured to drive the connecting part for movement; and
      a mounting part connected to the rotating part positioned on one of the opposite ends of the first swing rod, the mounting part defining a second air inlet hole connecting to the air inlet, the mounting part configured to be connected to external transfer part for transferring materials.

14. The robot according to claim 13, wherein the first air inlet hole comprises a first inlet port and a first outlet port communicated with the first air inlet hole, and the first inlet port is configured to introduce the air, an end of the rotating part defining the air inlet is inserted into the first outlet port and connected to the connecting part.

15. The robot according to claim 13, wherein the second air inlet hole comprises a second inlet port and a second outlet port communicated with the second air inlet hole, the second inlet port is configured to introduce air, an end of the rotating part defining the air inlet is inserted into the second outlet port and connected to the mounting part.

16. The robot according to claim 15, wherein the swing device comprises a plurality of swing mechanisms arranged around the support base; and the mounting part defines a plurality of second inlet ports arranged around the mounting part, the plurality of second air inlet holes are communicated with the air inlet of a corresponding rotating part.

17. The robot according to claim 13, wherein the swing device further comprises:
  an air inlet part configured to introduce the air,
  a detecting part configured to detect an air pressure in the movable groove,
  a first pipe, opposite ends of the first pipe connected to the air inlet part and the detecting part,
  a third pipe, opposite ends of the third pipe connected to the air inlet part and the first inlet port, and
  a fourth pipe, opposite ends of the fourth pipe connected to the air inlet part and the second inlet port.

18. The robot according to claim 13, wherein the at least one swing mechanism further comprises:
  a second swing rod, the second swing rod and the first swing rod are positioned on opposite sides of the connecting part, two of the plurality of joint assemblies are arranged on opposite ends of the second swing rod, the opposite ends of the second swing rod are further connected to a pair of the movable parts, and
  the connecting part is further connected to the rotating part positioned on one end of the second swing rod, the first air inlet hole is communicated with the air inlets of two rotating parts, the mounting part is further connected to the rotating part positioned on another end of the second swing rod, and the second air inlet hole is communicated with the air inlets of the two rotating parts.

19. The robot according to claim 18, wherein an end of each of the movable parts far away from the movable groove is engaged with an end of the first swing rod, and/or, the end of each part of the movable parts far away from the movable groove is engaged with an end of the second swing rod.

* * * * *